US009823500B2

(12) United States Patent
Lin et al.

(10) Patent No.: US 9,823,500 B2
(45) Date of Patent: Nov. 21, 2017

(54) OPTICAL ASSEMBLY FOR 90° POLARIZATION ROTATION

(71) Applicant: Lightel Technologies, Inc., Renton, WA (US)

(72) Inventors: Shyh-Chung Lin, Bellevue, WA (US); Hsin-Jung Lee, Newcastle, WA (US)

(73) Assignee: LIGHTEL TECHNOLOGIES, INC., Renton, WA (US)

( * ) Notice: Subject to any disclaimer, the term of this patent is extended or adjusted under 35 U.S.C. 154(b) by 560 days.

(21) Appl. No.: 14/499,024

(22) Filed: Sep. 26, 2014

(65) Prior Publication Data

US 2015/0370097 A1    Dec. 24, 2015

Related U.S. Application Data

(63) Continuation-in-part of application No. 14/312,613, filed on Jun. 23, 2014, now Pat. No. 9,541,776.

(51) Int. Cl.
| | |
|---|---|
| *G02B 5/30* | (2006.01) |
| *G02F 1/09* | (2006.01) |
| *G02B 27/28* | (2006.01) |
| *G02B 6/27* | (2006.01) |
| *G02B 5/04* | (2006.01) |

(52) U.S. Cl.
CPC ............. *G02F 1/09* (2013.01); *G02B 5/3083* (2013.01); *G02B 6/2766* (2013.01); *G02B 27/283* (2013.01); *G02B 27/286* (2013.01); *G02B 5/04* (2013.01); *G02F 2203/04* (2013.01); *G02F 2203/60* (2013.01)

(58) Field of Classification Search
CPC ...... G02B 5/30; G02B 5/3025; G02B 6/2746; G02B 27/28; G02B 27/283; G02B 27/286; G02F 1/09; G02F 1/093
USPC ............ 359/483.01, 484.01, 484.02, 484.03, 359/484.04, 484.05, 484.06, 484.1, 359/489.01, 489.02, 489.08, 489.09; 372/703
See application file for complete search history.

(56) References Cited

U.S. PATENT DOCUMENTS

| | | | |
|---|---|---|---|
| 2004/0213512 A1* | 10/2004 | Wu | ...................... G02B 6/2706 385/27 |
| 2015/0146291 A1* | 5/2015 | Mao | ...................... G02F 1/0136 359/484.02 |
| 2016/0282641 A1* | 9/2016 | Chen | ........................ G02F 1/09 |

* cited by examiner

*Primary Examiner* — Arnel C Lavarias
(74) *Attorney, Agent, or Firm* — Han IP Corporation; Andy M. Han (57) ABSTRACT

An optical assembly maintains 90° polarization rotation. In one aspect, an optical assembly includes a polarization beam splitter a rotational element and a path exchange mirror. The temperature, wavelength and manufacturing dependencies of polarization rotation of this optical assembly are minimal to nonexistent compared to conventional Faraday rotation assemblies as the optical fiber accepts only the desired rotation. As such these optical assemblies have no temperature and wavelength dependencies of the polarization rotation angle over broad temperature and wavelength ranges with minimal additional losses. In another aspect, the polarization dependence of reflection from the path exchange mirror is managed so as to minimize the polarization effect associated with oblique incidence.

23 Claims, 11 Drawing Sheets a) Forward propagation. b) Reverse propagation.

Fig 3 a) Forward propagation. b) Reverse propagation.

Fig 4 a) Forward propagation. b) Reverse propagation.

Fig 5 a) Forward propagation. b) Reverse propagation.

Fig 6 a) Forward propagation. b) Reverse propagation.

Fig 7 a) Forward propagation. b) Reverse propagation.

Fig 8 a) Forward propagation. b) Reverse propagation.

Fig 9 a) Forward propagation. b) Reverse propagation.

Fig 11

OPTICAL ASSEMBLY FOR 90° POLARIZATION ROTATION

CROSS REFERENCE TO RELATED PATENT APPLICATION

This is a continuation-in-part (CIP) of U.S. patent application Ser. No. 14/312,613, filed on 23 Jun. 2014 and entitled "Optical Assembly For 90° Polarization Rotation", which is herein incorporate by reference in its entirety.

TECHNICAL FIELD

The present disclosure relates to a low polarization dependent optical assembly for use in polarization rotation applications and, more particularly, to an optical assembly with minimal to no manufacturing variation in polarization rotation angle and minimal to no temperature and wavelength dependencies of the polarization rotation angle.

BACKGROUND

Figure 1:
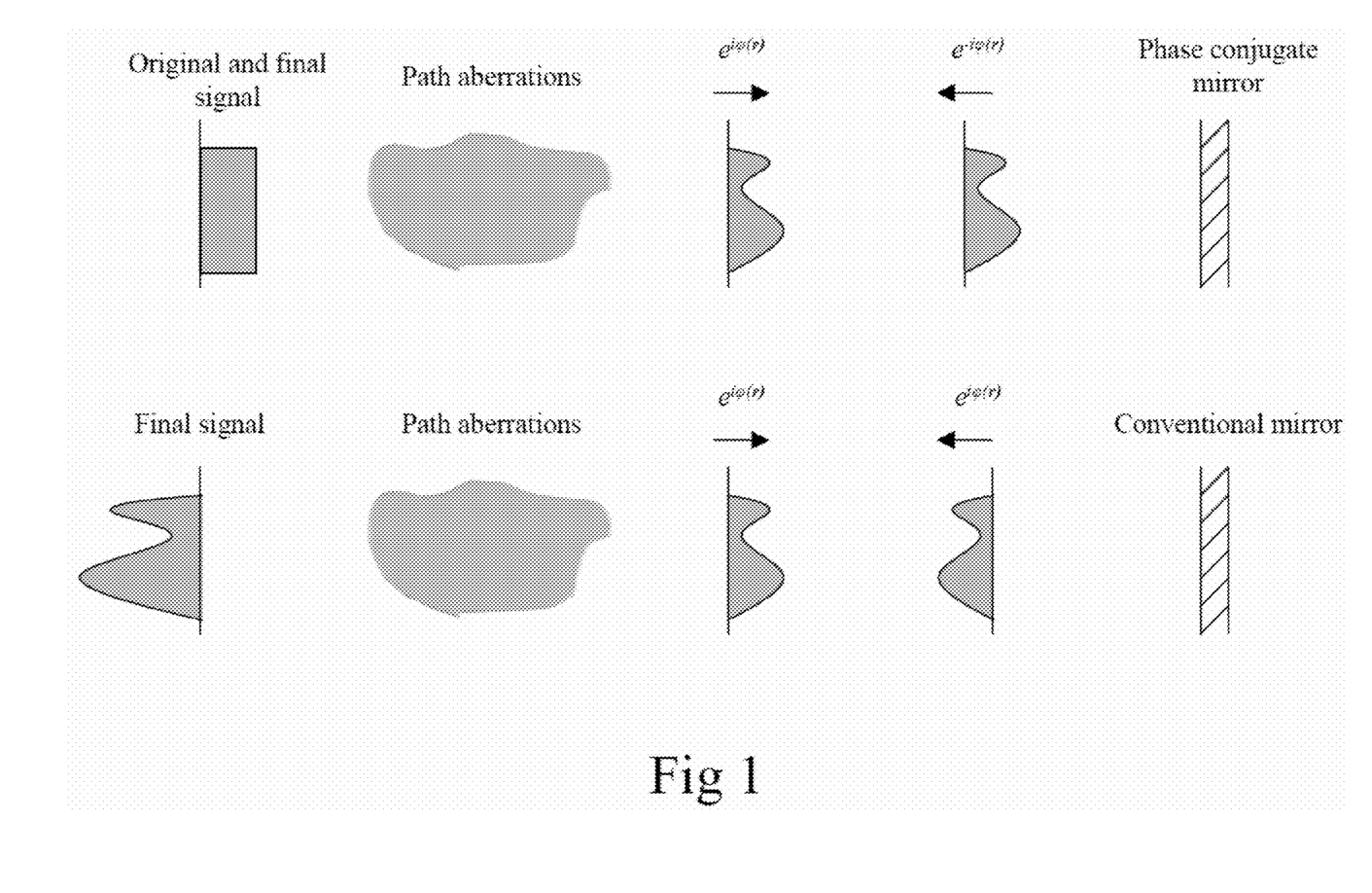
FIG. 1 is a diagram of a phase conjugate mirror and a comparable conventional mirror.

Polarization rotation devices have been used for various purposes in optical systems, especially in fiber optic communication, optical image processing, and sensor applications particularly with the use of phase conjugate mirrors. The capability of these devices is demonstrated in FIG. 1. A phase conjugate mirror is desirable in fiber optical systems as a result of the signal distortion caused by fiber birefringence. Phase conjugation, by interchanging the bases of the incident beam polarization, allows a signal to return through a system and experience the reverse distortion as opposed to additional distortion. Faraday rotation, or the Faraday Effect, is one known method for creating a phase conjugation mirror. The Faraday Effect allows for the realization of devices such as fiber optic isolators, circulators, and Faraday rotating mirrors.

The Faraday rotation is determined by:

$$\theta = VBL$$

where $\theta$ is the angle of polarization rotation after a single pass through the rotator, V is the Verdet constant, B is the applied or internal magnetic field strength and L is the length of the rotator. The Verdet constant is a property inherent to a particular material and is dependent on both temperature and wavelength. This limits the use of systems employing Faraday rotation over broad temperature and wavelength ranges. In most applications the rotator is used in the magnetic saturation region so as to avoid variations due to the magnetic field. The thickness also presents precision rotation problems, as it cannot be exactly controlled under manufacturing conditions. With the use of thin film techniques and growth methods, the variations are slight but still present.

The manufacturing tolerance as well as temperature and wavelength-dependent nature of conventional single crystals for polarization rotation limit the use of optical crystal devices in precision instruments as well as over broad temperature and wavelength ranges. These conventional means only provide the desired polarization rotation at a single wavelength and at a certain temperature, with that temperature and wavelength being dependent upon the manufacturing accuracy. Advances in optical communication, sensors, and image processing require broadband, multi-wavelength capacities such as WDM, CWDM, DWDM, in central offices and uncontrolled field environment. Therefore, there remains a need to develop optical assemblies with precise polarization rotation independent of other variables.

SUMMARY

In one aspect, an optical assembly may include a polarization beam splitter, a Faraday rotating element and a path exchange mirror. The orientation of these optical elements will be such that the return light that re-enters the fiber optic will have undergone a polarization rotation of exactly 90°. Any return light incident on the plane of the fiber optic that has not undergone a 90° rotation will be scattered, thus insuring the precision of the polarization rotation. In another aspect, an optical assembly may include management of the polarization dependence of reflection off the path exchange mirror. The orientation of these optical elements will be such that the reflection differences of incoming S and P polarizations off of the exchange mirror will be minimized.

In some embodiments, the polarization beam splitter may include a beam displacing crystal.

In some embodiments, the polarization beam splitter may include a birefringent crystal wedge.

In some embodiments, the polarization beam splitter may include a reflective polarizer.

In some embodiments, the polarization beam splitter may include a Glan-Thompson polarizer.

In some embodiments, the Faraday rotating element may include a thin film garnet.

In some embodiments, the Faraday rotating element may include a bismuth doped yttrium iron garnet.

In some embodiments, the Faraday rotating element may include an yttrium iron garnet.

In some embodiments, the Faraday rotating element may include a rare earth doped yttrium iron garnet.

In some embodiments, the Faraday rotating element may produce a nominally 90° polarization rotation through one pass.

In some embodiments, the path exchange mirror may include a 90° prism.

In some embodiments, the path exchange mirror may include a prism at an angle of 90°-$\beta$, where $\beta$ is the half angle of separation of the two paths.

In some embodiments, the path exchange mirror may include a 90° thin film coated prism.

In some embodiments, the path exchange mirror may include a thin film coated prism at an angle of 90°-$\beta$.

In some embodiments, the path exchange mirror may include a flat mirror when 2$\beta$, the angle of separation of the two paths, allows two paths to converge at the mirror.

In some embodiments, the Faraday rotating element may include a 90° rotator that intercepts one of the two paths only.

In some embodiments, the Faraday rotating element may include a 45° rotator that intercepts both paths.

In one aspect, a phase conjugate mirror comprising the optical assembly of the present disclosure is provided.

Detailed description of various embodiments are provided below, with reference to the attached figures, to promote better understanding of the characteristics and benefits of the various embodiments of the present disclosure.

DETAILED DESCRIPTION OF DISCLOSED EMBODIMENTS

The present disclosure describes an optical assembly that has minimal to no variation of the polarization rotation angle over broad temperature and wavelength ranges for any given manufacturing tolerances. This may be realized by the utilization of 1) a polarization beam splitter 2) a Faraday rotation crystal and 3) a path exchange mirror.

The above listed constituents work together in the following manner. The polarization beam splitter creates two paths with orthogonally oriented polarizations. One or both of these paths are incident upon a Faraday rotating crystal with a set internal or external magnetic field. Both paths then are incident upon the path exchange mirror which in one embodiment is a prism mirror. Since reflection from the exchange mirror often involves oblique incidence angles, the orientation of these optical elements will be such that the reflection differences of incoming S and P polarizations off of the exchange mirror will be minimized. The now reversed paths are again incident on the Faraday rotating crystal. Again incident upon the polarization beam splitter, only the portion of the beam that is orthogonal to its initial state will propagate through the beam splitter in a way to be incident upon and propagate down the fiber. As such for any given amount of rotation accuracy the returned beam will be perpendicular to its incoming state.

Embodiment 1

Figure 2:
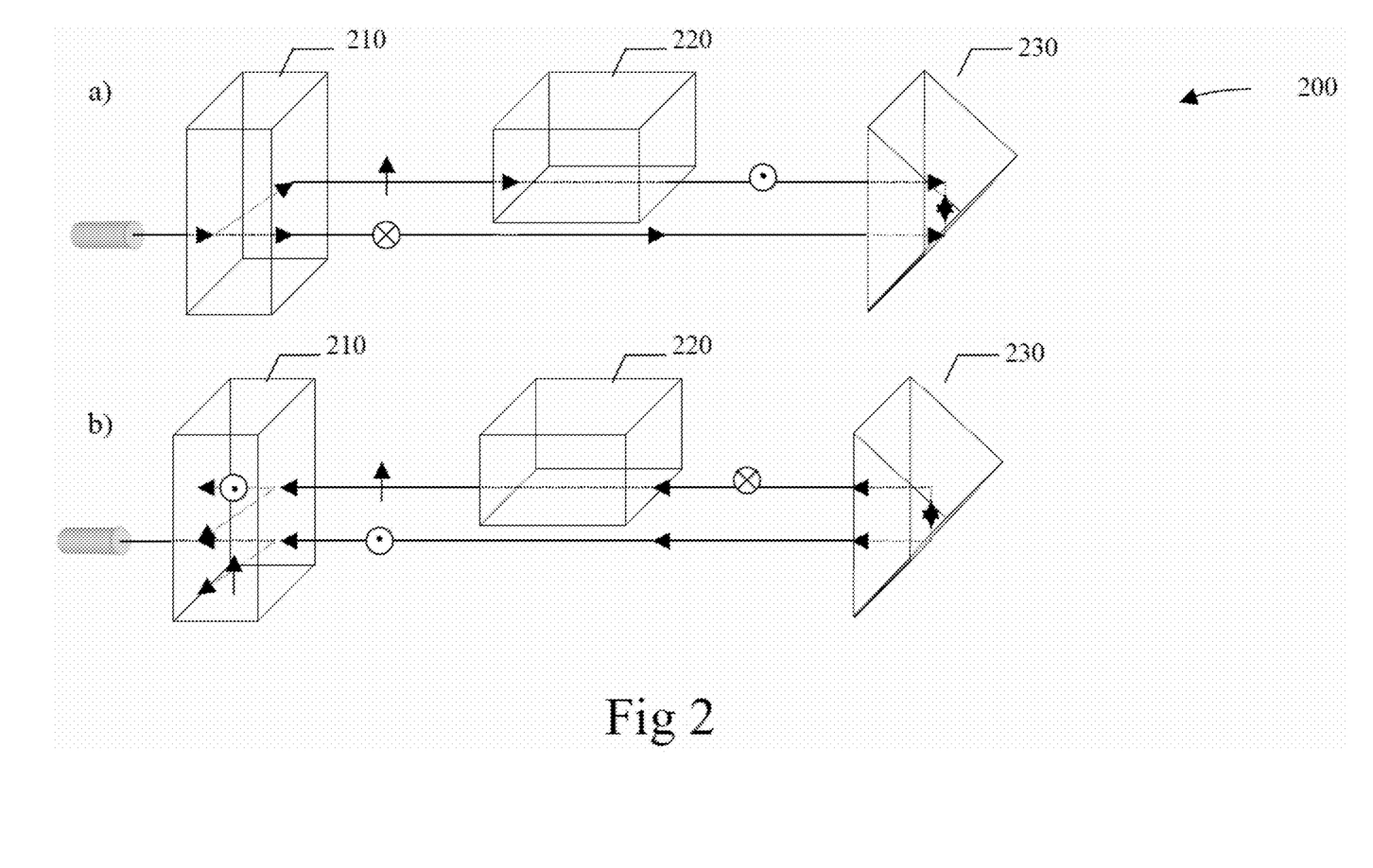
FIG. 2 is a diagram showing polarization rotation when light propagates through an optical assembly in accordance with one embodiment of the present disclosure.

In Embodiment 1, an optical assembly includes a linear layout and parallel propagation of the two orthogonal beam paths. Referring to FIG. 2, the optical assembly 200 includes a first crystal 210 a second crystal 220 and a third prism 230. In some embodiments, the optical assembly 200 may further include an optical waveguide. Crystal 220 is within an external magnet (not shown) having a magnetic field B axially aligned in a direction of propagation of light, or alternatively has a permanent internal magnetic field. A beam of light incident on the first crystal 210 is split into its constituent polarizations with displaced parallel paths. One of these beams is then incident upon crystal 220 and the polarization is rotated by 90° due to the Faraday Effect. These beams, with essentially the same polarization, are both then incident upon the 90° prism and by total internal reflection the beam paths are exchanged. Having the same polarization will negate differences in phase shift. Upon returning to the second crystal 220, the other beam is incident on the second crystal 220 and the polarization is rotated 90°. The first crystal 210 may be any birefringent parallel crystal. The second crystal 220 may be any Faraday rotating garnet. Examples of the second crystal 220 include a bulk of single crystal of yttrium iron garnet (YIG), or a thin film bismuth doped iron garnet. The third prism 230 may be any crystal with sufficient index for total internal reflection at the incident angle. Examples of the third prism 230 include a quartz prism. The beam will exit the device with a polarization entirely perpendicular to its incident state for the designed wavelengths and temperatures irrespective of manufacturing precision. The proposed design of rotating elements advantageously allows a desired value of rotation angle to be maintained across wider wavelength and temperature ranges for phase conjugate mirrors.

Embodiment 2

Figure 3:
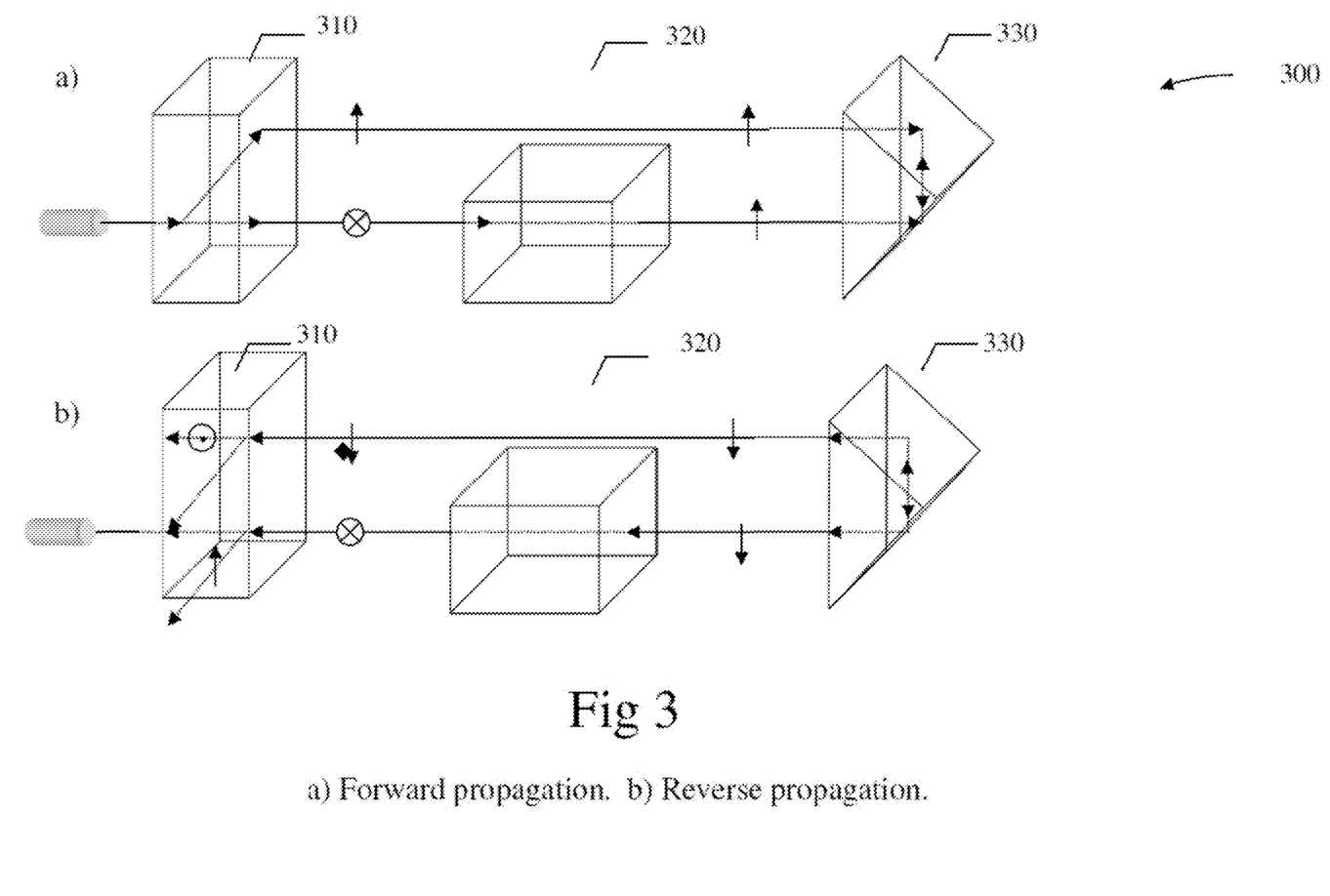
FIG. 3 is a diagram showing polarization rotation when light propagates through an optical assembly in accordance with another embodiment of the present disclosure.

Embodiment 2 differs from embodiment 1 in the placement of the Faraday rotating crystal. Referring to FIG. 3, the optical assembly 300 includes a first crystal 310 a second crystal 320 and a third prism 330. In some embodiments, the optical assembly 300 may further include an optical waveguide. Crystal 320 is positioned such that only one path is incident upon it. Crystal 320 is within an external magnet (not shown) having a magnetic field B axially aligned in a direction of propagation of light, or alternatively has a permanent internal magnetic field. A beam of light incident on the first crystal 310 is split into its constituent polarizations with displaced parallel paths. One of these beams is then incident on the second crystal 320 and the polarization is rotated 90° due to the Faraday Effect. These beams, with essentially the same polarization, are both then incident upon the 90° prism and by total internal reflection the beam paths are exchanged. Upon returning to the second crystal 320, the other beam is incident on the second crystal 320 and the polarization is rotated 90°. The first crystal 310 may be any birefringent parallel crystal. The second crystal 320 may be any Faraday rotating garnet. Examples of the second crystal 320 include a bulk of single crystal of yttrium iron garnet (YIG), or a thin film bismuth doped iron garnet. The third prism 330 may be any optically transparent material. Examples of the third prism 330 include a quartz prism. The beam will exit the device with a polarization entirely perpendicular to its incident state for the designed wavelengths and temperatures irrespective of manufacturing precision. The proposed design of rotating elements advantageously allows a desired value of rotation angle to be maintained across wider wavelength and temperature ranges for phase conjugate mirrors.

Embodiment 3

Embodiment 3 differs from Embodiment 1 in the addition of a thin film reflecting coating to the path exchange mirror.

Figure 4:
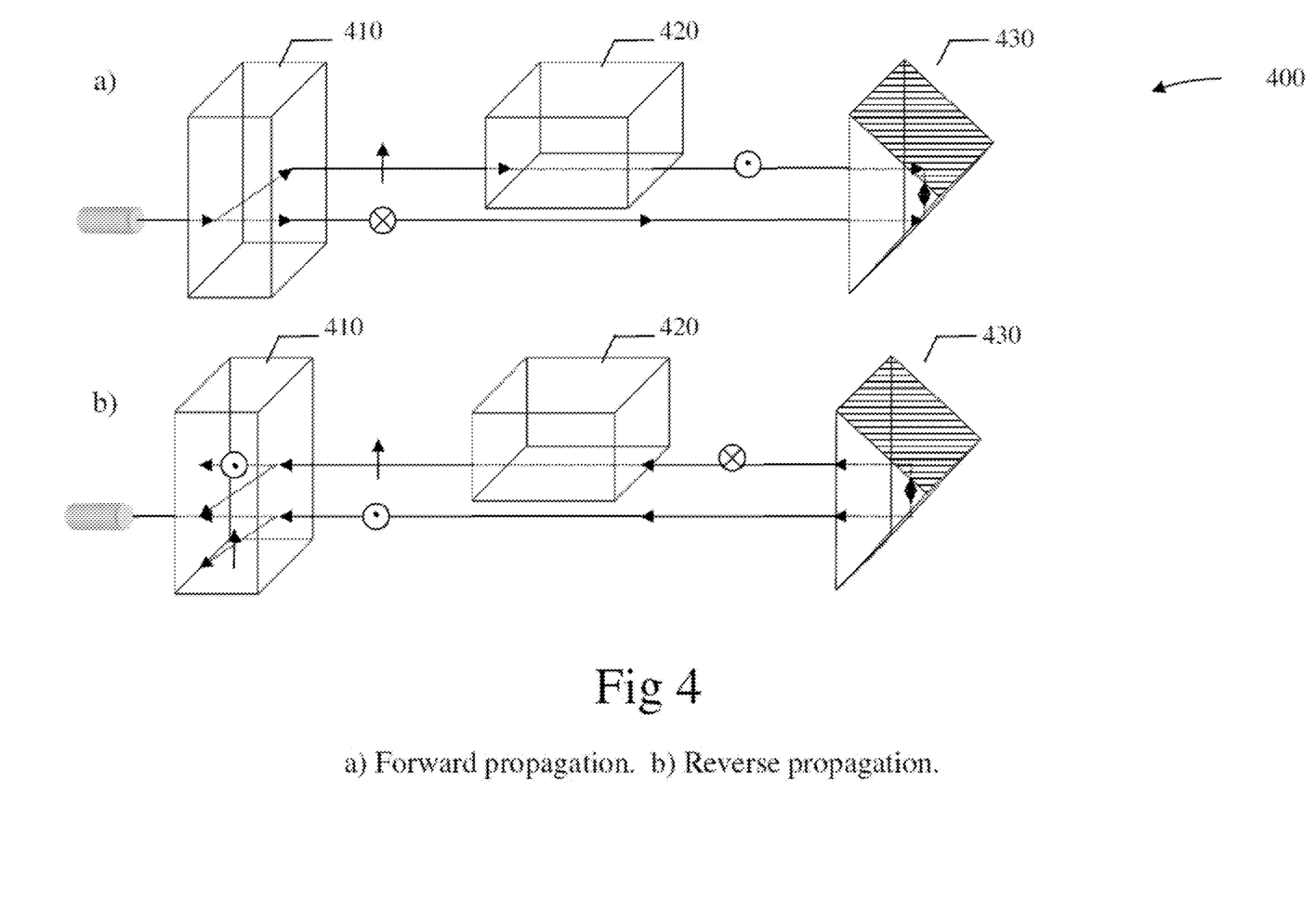
FIG. 4 is a diagram showing polarization rotation when light propagates through an optical assembly in accordance with another embodiment of the present disclosure.

Referring to FIG. 4, the optical assembly 400 includes a first crystal 410 a second crystal 420 and a third prism 430 with a thin film metallic coating. In some embodiments, the optical assembly 400 may further include an optical waveguide. Crystal 420 is positioned such that only one path is incident upon it. Crystal 420 is within an external magnet (not shown) having a magnetic field B axially aligned in a direction of propagation of light, or alternatively has a permanent internal magnetic field. A beam of light incident on the first crystal 410 is split into its constituent polarizations with displaced parallel paths. One of these beams is then incident on the second crystal 420 and the polarization is rotated 90° due to the Faraday Effect. These beams, with essentially the same polarization, are both then incident upon the 90° prism and by reflection from a metallic surface the beam paths are exchanged. Upon returning to the second crystal 420, the other beam is incident on the second crystal 420 and the polarization is rotated 90°. The first crystal 410 may be any birefringent parallel crystal. The second crystal 420 may be any Faraday rotating garnet. Examples of the second crystal 420 include a bulk of single crystal of yttrium iron garnet (YIG), or a thin film bismuth doped iron garnet. The third prism 430 may be any optically transparent crystal with a metallic coating. Examples of the third prism 430 include a quartz prism with a thin film gold coating. The beam will exit the device with a polarization entirely perpendicular to its incident state for the designed wavelengths and temperatures irrespective of manufacturing precision. The proposed design of rotating elements advantageously allows a desired value of rotation angle to be maintained across wider wavelength and temperature ranges for phase conjugate mirrors.

Embodiment 4

Figure 5:
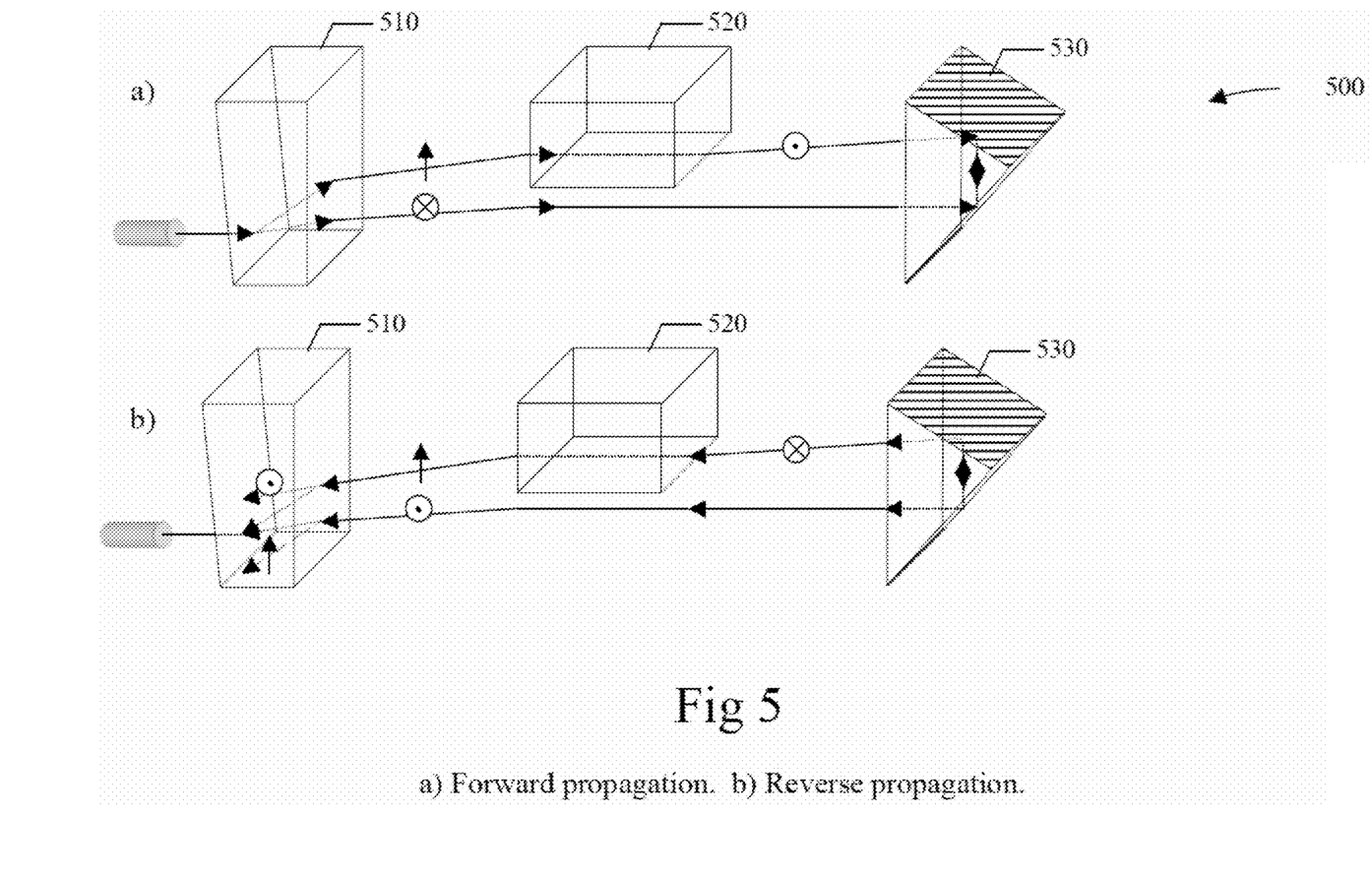
FIG. 5 is a diagram showing polarization rotation when light propagates through an optical assembly in accordance with yet another embodiment of the present disclosure.

Embodiment 4 differs from Embodiment 3 in that the first crystal is not a parallelepiped, but rather a birefringent wedge, creating non-parallel paths with an angle of separation $2\beta$ and requiring the third prism to be of an angle $90°-\beta$. Referring to FIG. 5, an optical assembly 500 includes a first crystal 510, which is a birefringent wedge, a second crystal 520, which is a Faraday rotator with a nominal rotation of 90°, and a third prism 530 which is an angle of $90°-\beta$. In some embodiments, the optical assembly 500 may further include an optical waveguide. The second crystal 520 is encompassed within an external magnet (not shown) having a magnetic field B axially aligned in a direction of propagation of light, or alternatively has an internal permanent magnetic field of similar alignment. A beam of light incident on the first crystal 510 is split into its constituent polarizations with displaced nonparallel paths. One of these beams is then incident on the second crystal 520 and is rotated 90° due to the Faraday Effect. These beams, with essentially the same polarization, are then incident upon the prism and by metallic reflection the beam paths are exchanged. The first crystal 510 may be any birefringent wedge crystal. The second crystal 520 may be any Faraday rotating garnet. Examples of the second crystal 520 include a bulk of single crystal of yttrium iron garnet (YIG), or a thin film bismuth doped iron garnet. The third prism 530 may be any crystal with a metallic thing film coating. Examples of the third prism 530 include a gold thin film on a quartz prism. The beam will exit the device with a polarization entirely perpendicular to its incident state for the designed wavelengths and temperatures irrespective of manufacturing precision. The proposed design of rotating elements advantageously allows a desired value of rotation angle to be maintained across wider wavelength and temperature ranges for phase conjugate mirrors.

Embodiment 5

Figure 6:
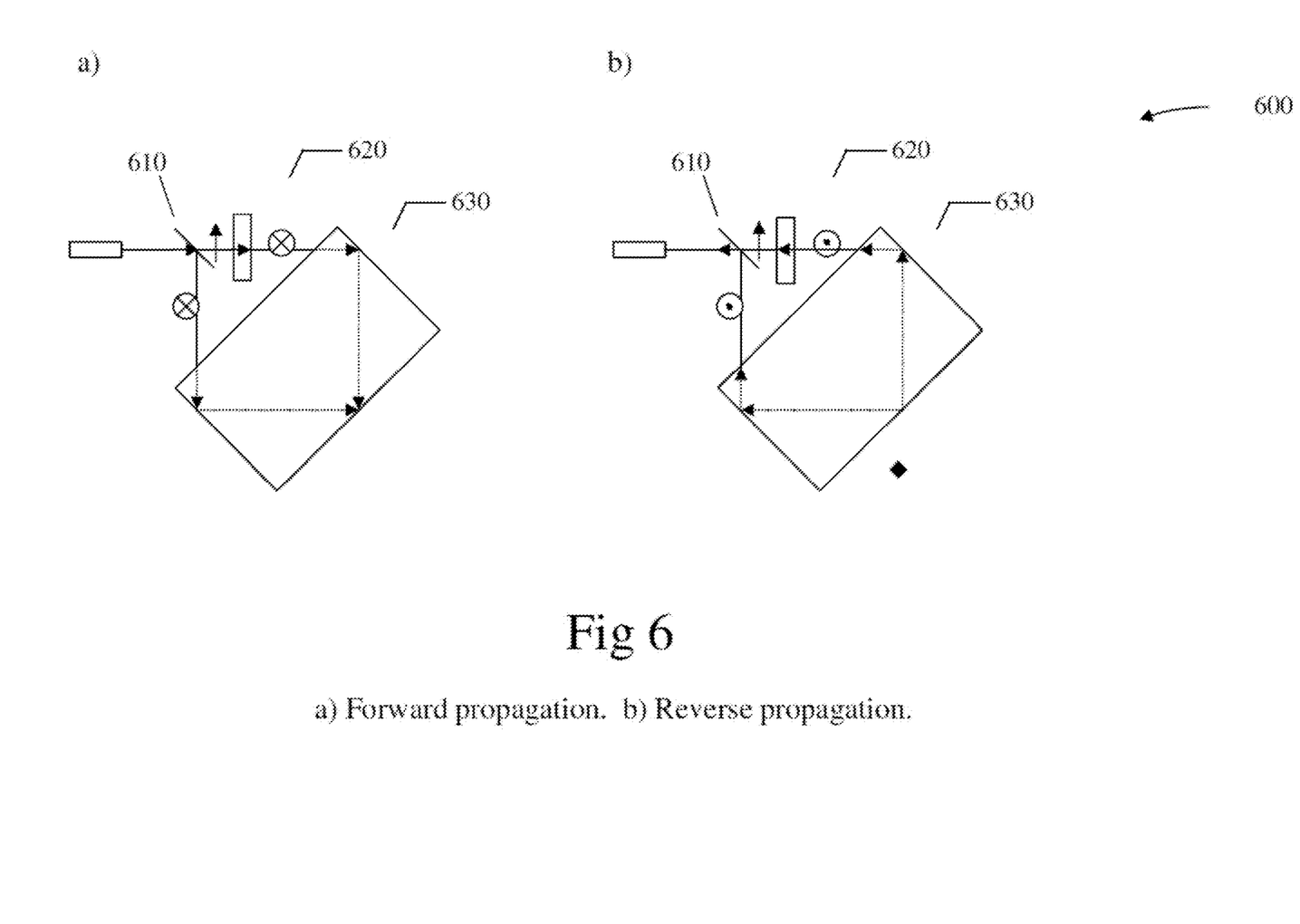
FIG. 6 is a diagram showing polarization rotation when light propagates through an optical assembly in accordance with yet another embodiment of the present disclosure.

In Embodiment 5 an optical assembly includes a nonlinear layout and perpendicularly propagating beams. Referring to FIG. 6, an optical assembly 600 includes a first crystal 610, which is a reflective linear polarizer, a second crystal 620, which is a Faraday rotator with a nominal rotation of 90°, and a third crystal 630 which is a rectangular thin film coated reflector. In some embodiments, the optical assembly 600 may further include an optical waveguide. The second crystal 620 is encompassed within an external magnet (not shown) having a magnetic field B axially aligned in a direction of propagation of light, or alternatively has an internal permanent magnetic field of similar alignment. A beam of light incident on the first crystal 610 is split into its constituent polarizations with perpendicular propagation paths. One beam is then incident on the second crystal 620 and has a polarization rotation of 90° due to the Faraday Effect. These beams, with essentially the same polarization, are then incident upon the prism and by metallic reflection the beam paths are exchanged. Upon returning to the second crystal 620, the other beam is incident on the second crystal 620 and the polarization is rotated 90°. The first crystal 610 may be any polarization splitting crystal. The second crystal 620 may be any Faraday rotating garnet. Examples of the second crystal 620 include a bulk of single crystal of yttrium iron garnet (YIG), or a thin film bismuth doped iron garnet. The third crystal 630 may be any crystal with a thin film metallic coating. Examples of the third crystal 630 include a quartz cube with a gold thin film. The beam will exit the device with a polarization entirely perpendicular to its incident state for the designed wavelengths and temperatures irrespective of manufacturing precision. The proposed design of rotating elements advantageously allows a desired value of rotation angle to be maintained across wider wavelength and temperature ranges for phase conjugate mirrors.

Embodiment 6

Figure 7:
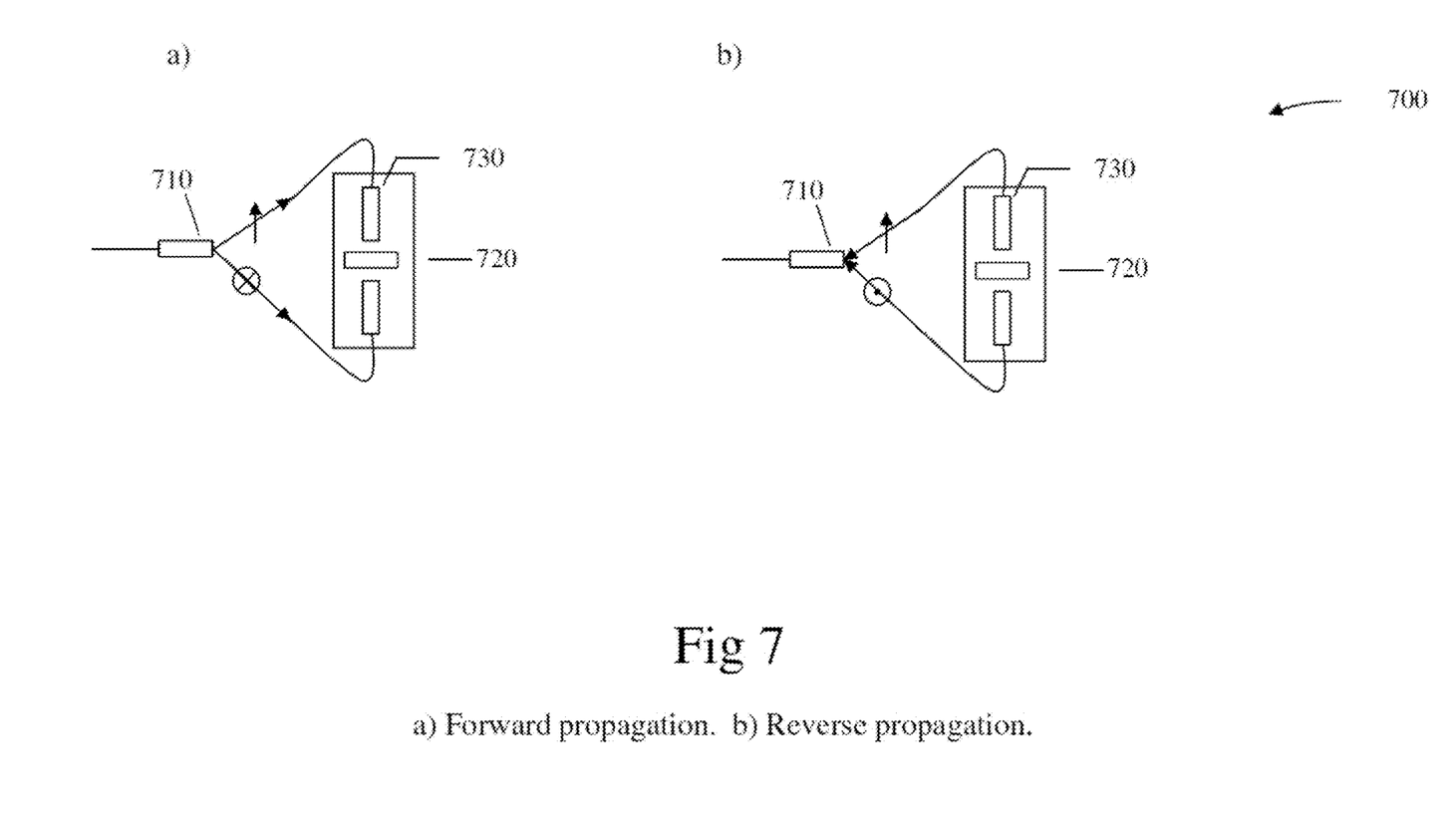
FIG. 7 is a diagram showing polarization rotation when light propagates through an optical assembly in accordance with yet another embodiment of the present disclosure.

In Embodiment 6 an optical assembly includes a nonlinear layout and fiber integration. Referring to FIG. 7, an optical assembly 700 includes a first element 710, which is a polarizing beam splitter with Polarization Maintaining (PM) fiber at both outputs, a second crystal 720, which is a Faraday rotator with a nominal rotation of 90°, and a third set of path exchange optics 730 which is a set of PM fiber collimators of crossed alignment collinearly coupled to each other. In some embodiments, the optical assembly 700 may further include an optical waveguide. The second crystal 720 is encompassed within an external magnet (not shown) having a magnetic field B axially aligned in a direction of propagation of light, or alternatively has an internal permanent magnetic field of similar alignment. A beam of light incident on the first element 710 is split into its constituent polarizations with propagation paths along the two output fibers. The two beams propagate the path exchange optics 730 and are incident upon the second crystal 720 and undergo polarization rotation of 90° due to the Faraday Effect. The first crystal 710 may be any in-line polarization splitting device. The second crystal 720 may be any Faraday rotating garnet. Examples of the second crystal 720 include a bulk of single crystal of yttrium iron garnet (YIG), or a thin film bismuth doped iron garnet. The third path exchange optics 730 may be any length of PM fiber with any method of collimation at the fiber end. Examples of collimators include convex lenses aligned to the pigtail. The beam will exit the device with a polarization entirely perpendicular to its incident state for the designed wavelengths and temperatures irrespective of manufacturing precision. The proposed design of rotating elements advantageously allows a desired value of rotation angle to be maintained across wider wavelength and temperature ranges for phase conjugate mirrors.

Embodiment 7

Figure 8:
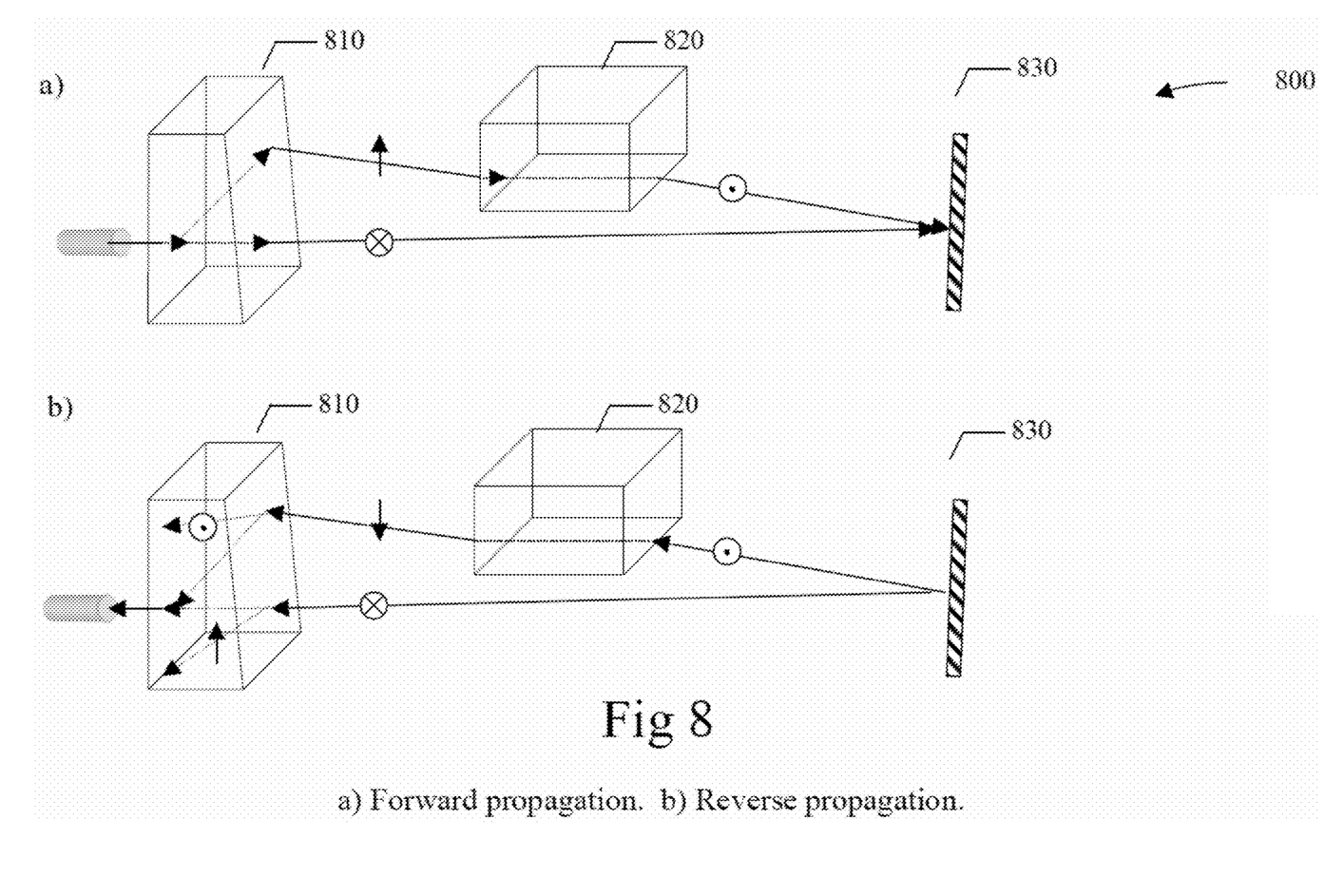
FIG. 8 is a diagram showing polarization rotation when light propagates through an optical assembly in accordance with yet another embodiment of the present disclosure.

Embodiment 7 differs from Embodiment 4 in that the first crystal, a birefringent prism, creates non-parallel paths with an angle separation of $2\beta$ and allows two emerging beams to converge at a distance where a flat reflecting mirror is located. Referring to FIG. 8, an optical assembly 800 includes a first crystal 810, which is a birefringent prism, a second crystal 820, which is a Faraday rotator with a nominal rotation of 90°, and a flat mirror 830. In some embodiments, the optical assembly 800 may further include an optical waveguide. The second crystal 820 is encompassed within an external magnet (not shown) having a magnetic field B axially aligned in a direction of propagation of light, or alternatively has an internal permanent magnetic field of similar alignment. A beam of light incident on the first crystal 810 is split into its constituent polarizations with displaced nonparallel paths. One of these beams is then incident on the second crystal 820 and the polarization is rotated 90° due to the Faraday Effect. These beams, with essentially the same polarization, are then incident upon the mirror and the beam paths are exchanged. Upon returning to the second crystal 820, the other beam is incident on the second crystal 820 and the polarization is rotated 90°. The first crystal 810 may be any birefringent prism crystal. The second crystal 820 may be any Faraday rotating garnet. Examples of the second crystal 820 include a bulk of single crystal of yttrium iron garnet (YIG), or a thin film bismuth doped iron garnet. The mirror 830 may be any crystal with a metallic thing film coating or dielectric coating. Examples of the mirror 830 include a gold thin film on a quartz plate. The beam will exit the device with a polarization entirely perpendicular to its incident state for the designed wavelengths and temperatures irrespective of manufacturing precision. The proposed design of rotating elements advantageously allows a desired value of rotation angle to be maintained across wider wavelength and temperature ranges for phase conjugate mirrors.

Embodiment 8

Figure 9:
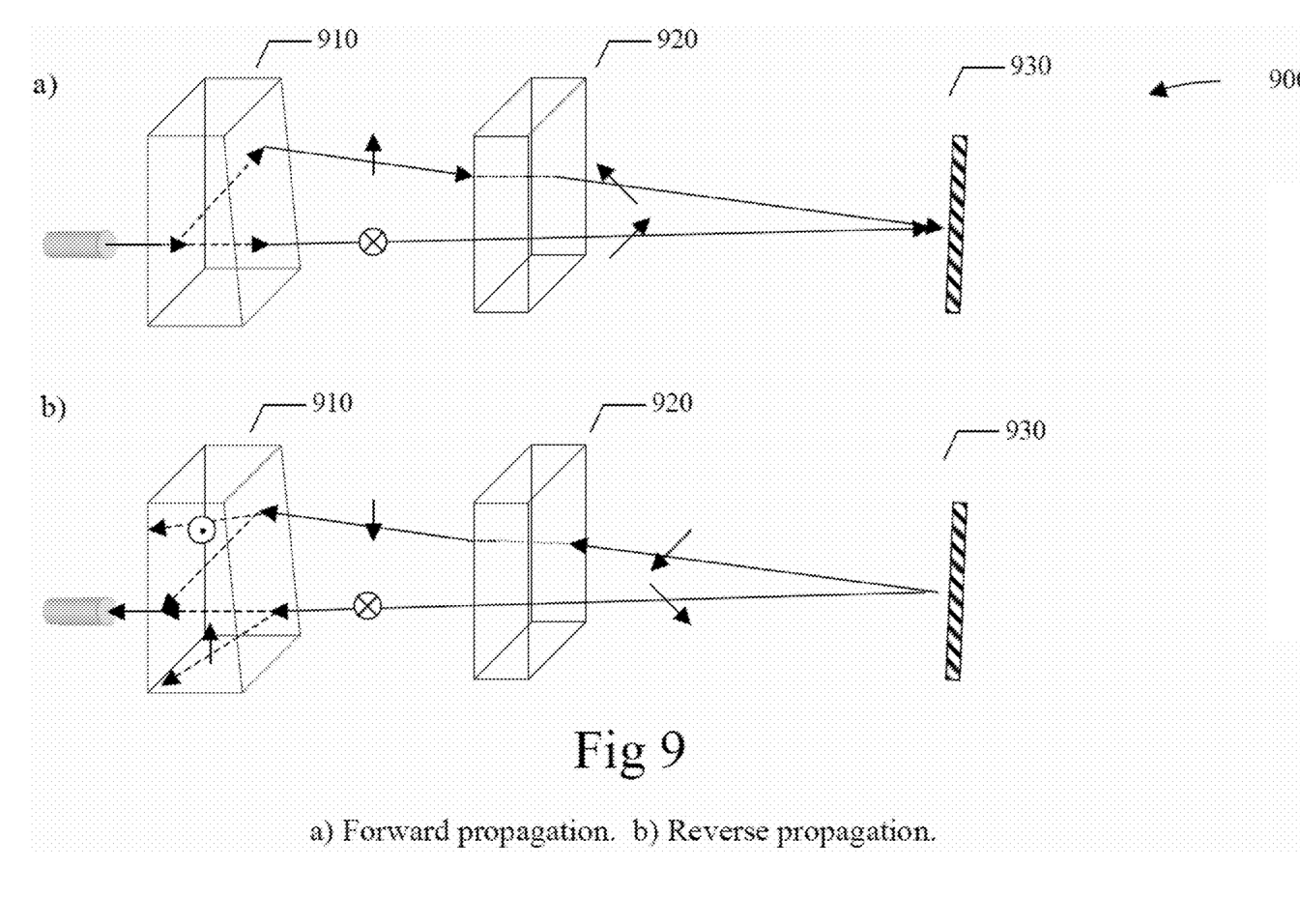
FIG. 9 is a diagram showing polarization rotation when light propagates through an optical assembly in accordance with yet another embodiment of the present disclosure.

Embodiment 8 differs from Embodiment 4 in that the first crystal is a single element birefringent prism (FIG. 11), creating non-parallel paths with a small angle separation of $2\beta$ and allows two emerging beams to converge at a distance where a reflecting mirror is located. Referring to FIG. 9, an optical assembly 900 includes a first crystal 910, which is a single element birefringent prism, a second crystal 920, which is a Faraday rotator with a nominal rotation of 45°, and a flat mirror 930. In some embodiments, the optical assembly 900 may further include an optical waveguide. The second crystal 920 is encompassed within an external magnet (not shown) having a magnetic field B axially aligned in a direction of propagation of light, or alternatively has an internal permanent magnetic field of similar alignment. A beam of light is incident on the first crystal 910 and split into its constituent polarizations with displaced nonparallel paths. Both beams are then incident on the second crystal 920 and the polarization is rotated 45° due to the Faraday Effect. These beams are then incident, with an incidence angle of less than 8°, upon the mirror and the beam paths are exchanged. Upon returning to the second crystal 920, both beams are rotated 45° again, 90° in all relative to the incoming beams. The first crystal 910 may be any birefringent prism crystal. The second crystal 920 may be any Faraday rotating garnet. Examples of the second crystal 920 include a bulk of single crystal of yttrium iron garnet (YIG), or a thin film bismuth doped iron garnet. The mirror 930 may be any crystal with a metallic thing film coating or dielectric coating. Examples of the mirror 930 include a gold thin film on a quartz plate. The beam will exit the device with a polarization entirely perpendicular to its incident state for the designed wavelengths and temperatures irrespective of manufacturing precision. The proposed design of rotating elements advantageously allows a desired value of rotation angle to be maintained across wider wavelength and temperature ranges for phase conjugate mirrors.

Embodiment 9

Figure 10:
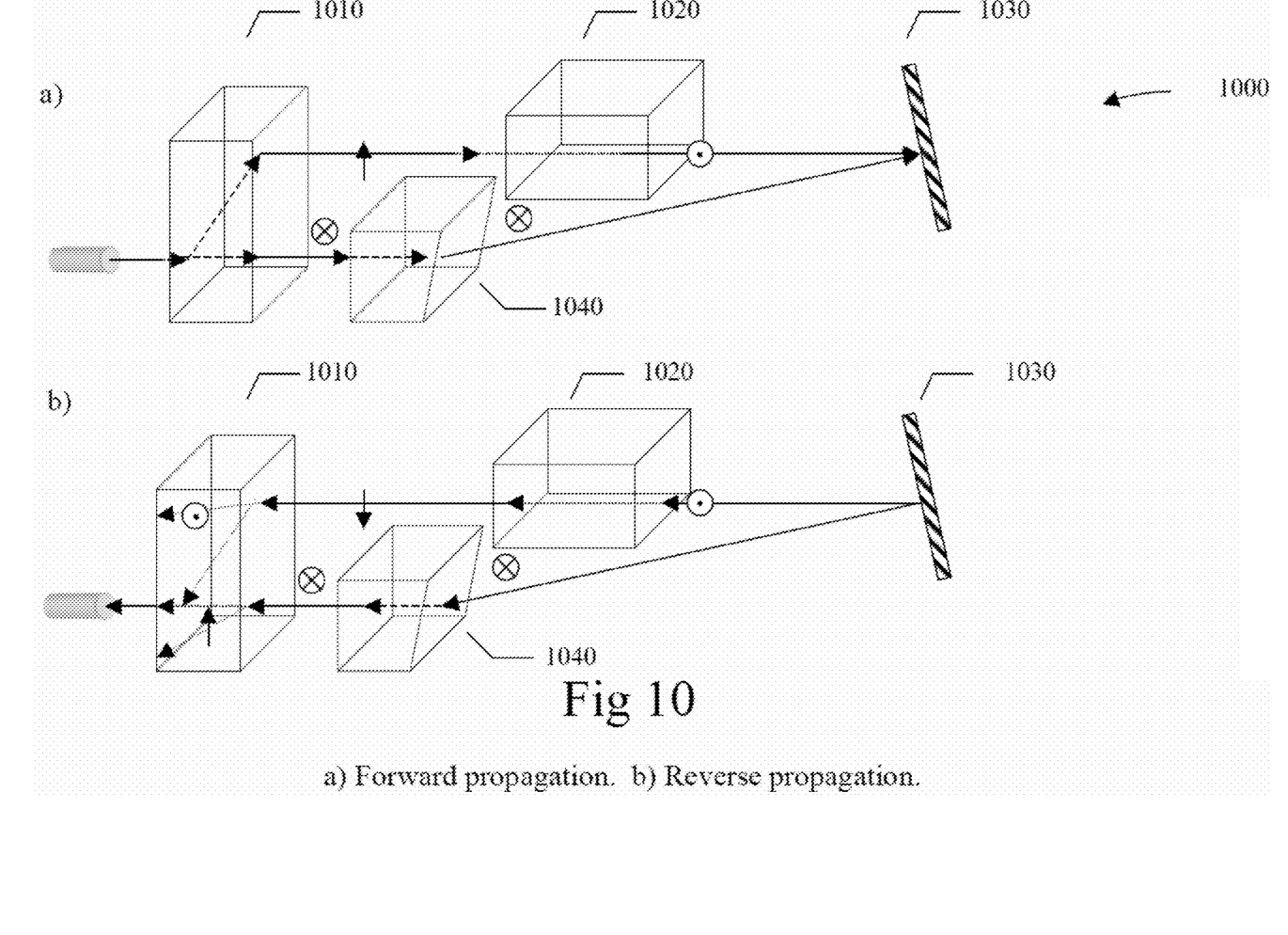
FIG. 10 is a diagram showing polarization rotation when light propagates through an optical assembly in accordance with yet another embodiment of the present disclosure.

Embodiment 9 differs from Embodiment 4 in that an additional prism 1040 is inserted in between the first crystal 1010 and the second crystal 1020, creating non-parallel paths with an angle of separation of $2\beta$ and allows two emerging beams to converge at a distance where a reflecting mirror is located. Referring to FIG. 10, an optical assembly 1000 includes a first crystal 1010, which is a birefringent prism, a second crystal 1020, which is a Faraday rotator with a nominal rotation of 90°, a flat mirror 1030, and a wedge prism 1040. In some embodiments, the optical assembly 1000 may further include an optical waveguide. The second crystal 1020 is encompassed within an external magnet (not shown) having a magnetic field B axially aligned in a direction of propagation of light, or alternatively has an internal permanent magnetic field of similar alignment. A beam of light incident on the first crystal 1010 is split into its constituent polarizations with displaced parallel paths. The first beam is then incident on the second crystal 1020 and its polarization is rotated 90° due to the Faraday Effect while the second beam is incident on the wedge prism and its path is tilted toward the first beam. These beams, with essentially the same polarization, are then incident upon the mirror and the beam paths are exchanged. Upon returning from the mirror, the second beam is incident on the second crystal 1020 and its polarization is rotated 90° due to the Faraday Effect while the first beam is incident on the wedge prism and its path is tilted toward the second beam. The first crystal 1010 may be any birefringent crystal. The second crystal 1020 may be any Faraday rotating garnet. Examples of the second crystal 1020 include a bulk of single crystal of yttrium iron garnet (YIG), or a thin film bismuth doped iron garnet. The mirror 1030 may be any crystal with a metallic thing film coating or dielectric coating. Examples of the mirror 1030 include a gold thin film on a quartz plate. The beam will exit the device with a polarization entirely perpendicular to its incident state for the designed wavelengths and temperatures irrespective of manufacturing precision. The proposed design of rotating elements advantageously allows a desired value of rotation angle to be maintained across wider wavelength and temperature ranges for phase conjugate mirrors.

Figure 11:
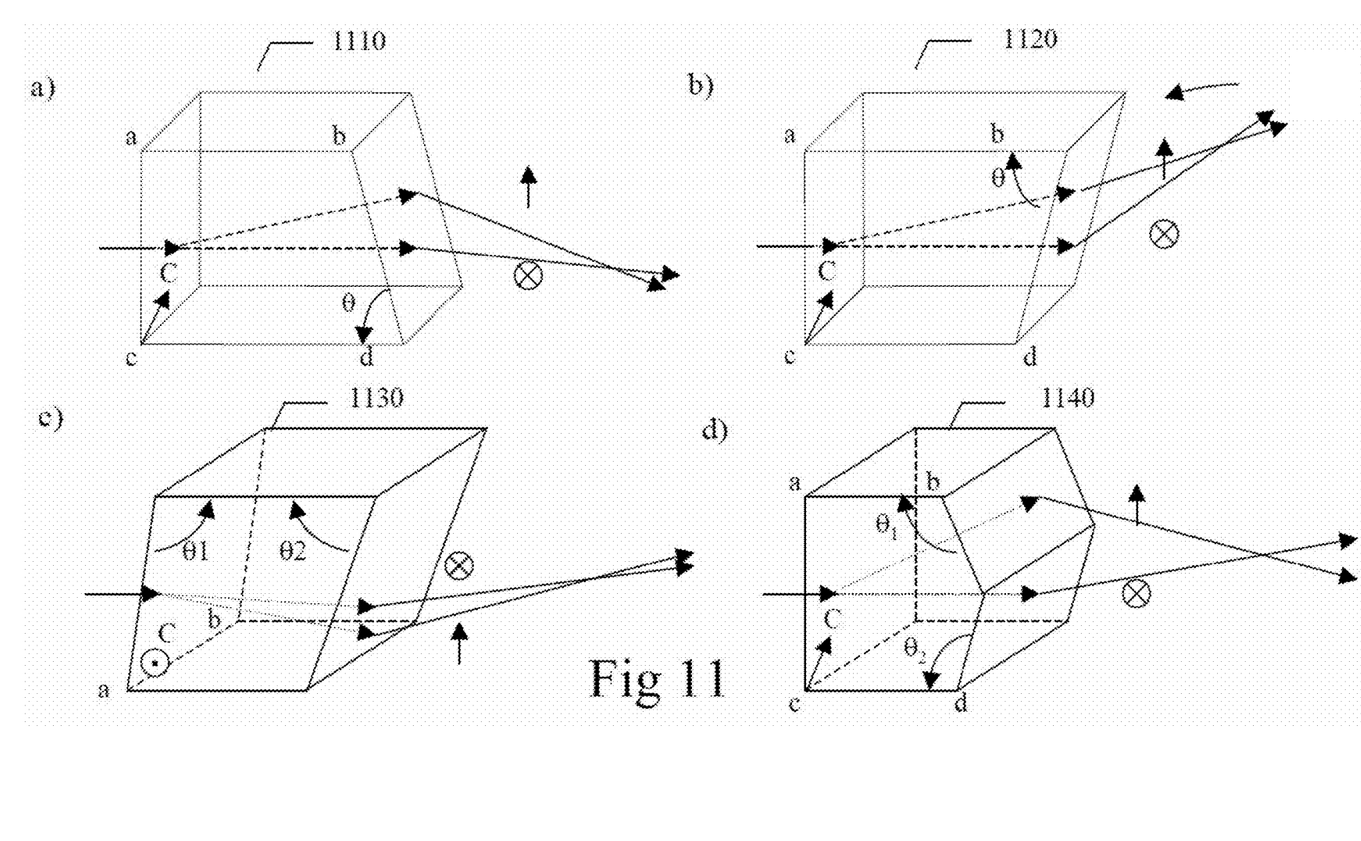
FIG. 11 shows single element birefringent prisms that allow two emerging polarized beams to converge at a distance.

FIG. 11 shows single element birefringent prisms that allow two emerging polarized beams to converge at a distance. Prism 1110 is a single element polarization beam splitter with converging beams. Optical axis C is on the plane of abcd, where $n_e > n_o$. Prism 1120 is a single element polarization beam splitter with converging beams. Optical axis C is on the plane of abcd, where $n_o > n_e$. Prism 1130 is a single element polarization beam splitter with converging beams. Optical axis C is along edge ab, where $n_e > n_o$. Prism 1140 is a single element polarization beam splitter with converging beams. Optical axis C is on the plane abcd.

Highlights

In view of the above, select features of embodiments of the present disclosure are highlighted below.

In one aspect, an optical assembly may include: one polarization beam splitter, one Faraday rotating crystal and one path exchange mirror.

In some embodiments, the path exchange mirror may be configured such that two polarized beams incident on the path exchange mirror have nominally a same polarization.

In some embodiments, the Faraday rotating crystal may intercept optical beams only once.

In some embodiments, the Faraday rotating crystal may rotate optical polarization by 90° nominally per pass.

In some embodiments, the polarization beam splitter may include a birefringent crystal that creates the two polarized beams emerging in parallel.

In some embodiments, the path exchange mirror may include a 90° prism.

In some embodiments, the path exchange mirror may include a 90° prism with metal thin film coating.

In some embodiments, the path exchange mirror may include a 90° prism with dielectric thin film coating.

In some embodiments, the polarization beam splitter may include a birefringent wedge crystal with two polarized beams emerging at an angle of 2β relative to each other.

In some embodiments, the path exchange mirror may include a prism of angle 90°-β.

In some embodiments, the path exchange mirror may include a 90°-β prism with metal thin film coating.

In some embodiments, the path exchange mirror may include a 90°-β prism with dielectric thin film coating.

In some embodiments, the path exchange mirror may include a flat mirror.

In some embodiments, the polarization beam splitter may include a combination of a birefringent beam displacer and a prism, from which two emerging polarized beams converge at a distance.

In some embodiments, the polarization beam splitter, the Faraday rotating crystal, and the path exchange mirror may be deposited on the same substrate. In some embodiments, the optical assembly may further include an optical waveguide.

In some embodiments, the path exchange mirror may include a rectangular crystal with a reflective coating.

In some embodiments, the polarization beam splitter comprises a linear polarizer that transmits one polarization and reflects another polarization. In some embodiments, the polarization beam splitter may include a Glan-Thompson polarizing cube.

In some embodiments, the polarization beam splitter may include a single element birefringent prism, from which two emerging polarized beams converge at a distance. In some embodiments, the two emerging polarized beams may be incident on the path exchange mirror with an incidence angle of less than 8°. In some embodiments, the Faraday rotating crystal may include a 45° rotator that intercepts both paths of the two emerging polarized beams. In some embodiments, the path exchange mirror may include a flat mirror.

In another aspect, a phase conjugate mirror may include an optical assembly that includes: one polarization beam splitter, one Faraday rotating crystal and one path exchange mirror. The path exchange mirror may be configured such that two polarized beams incident on the path exchange mirror have nominally a same polarization.

In yet another aspect, an optical assembly may include: one polarization beam splitter with polarization maintaining (PM) fibers at both outputs thereof and a non-PM fiber at an input thereof; one Faraday rotator with nominally 90° Faraday rotation with PM fibers on both sides thereof; and a connection of polarization beam splitter PM output fibers to PM fibers of the Faraday rotator configured to function as a path exchanger.

In still another aspect, a single element birefringent prism may be configured such that two polarized beams emerge therefrom at an angle 2β and converge at a distance. The angle 2β may be an angle of separation of the two polarized beams.

These embodiments may be used together, individually or with Polarization Splitting/Combining elements, Polarization Rotation elements, and Path Exchanging elements interchanged to create a phase conjugate mirror employing Faraday rotation. These assemblies allow a precise value of polarization rotation across wider wavelength and temperature ranges as well as an independence of manufacturing capabilities.

What is claimed is:

1. An optical assembly, comprising:
   one single element polarization beam splitter wedge;
   one Faraday rotating crystal; and
   one flat path exchange mirror,
   wherein the single element polarization beam splitter edge, the Faraday rotating crystal and the flat path exchange mirror are arranged such that an incoming light beam entering a first surface of the polarization beam splitter wedge emerges at a second surface thereof as two angularly separated orthogonally polarized output light beams that converge at a distance,
   wherein the Faraday rotating crystal is located between the polarization beam splitter wedge and the flat path exchange mirror,
   wherein the flat path exchange mirror is located at a converging point where the two orthogonally polarized light beams reflect and exchange paths,
   wherein an incoming collimated optical beam enters the polarization beam splitter wedge at the first surface and emerges at the second surface as two angularly separated orthogonally polarized output beams such that the two beams converge at the flat path exchange mirror, reflect and exchange paths,
   wherein the Faraday rotating crystal is located between the polarization beam splitter wedge and the flat path exchange mirror so that polarization of each polarized output beam is rotated nominally 90° round trip, and
   wherein, as the two reflected orthogonally polarized beams pass through the polarization beam splitter wedge in reverse directions, 90° polarization rotated components of these two beams recombine and emerge as one beam in a reverse direction of incoming collimated optical beam with polarization rotated 90° relative to the incoming collimated optical beam polarization while non-rotated components of these two beams emerge in an angle relative to the incoming collimated optical beam and are isolated and subsequently discarded.

2. The optical assembly of claim 1, wherein the path exchange mirror is configured such that two polarized beams incident on the path exchange mirror have nominally a same polarization.

3. The optical assembly of claim 1, wherein the Faraday rotating crystal intercepts optical beams only once.

4. The optical assembly of claim 1, wherein the Faraday rotating crystal rotates optical polarization by 90° nominally per pass.

5. The optical assembly of claim 2, wherein the polarization beam splitter comprises a birefringent crystal that creates the two polarized beams emerging in parallel.

6. The optical assembly of claim 5, wherein the path exchange mirror comprises a 90° prism.

7. The optical assembly of claim 5, wherein the path exchange mirror comprises a 90° prism with metal thin film coating.

8. The optical assembly of claim 5, wherein the path exchange mirror comprises a 90° prism with dielectric thin film coating.

9. The optical assembly of claim 2, wherein the polarization beam splitter comprises a birefringent wedge crystal with two polarized beams emerging at an angle of 2β relative to each other.

10. The optical assembly of claim 9, wherein the path exchange mirror comprises a prism of angle 90°-β.

11. The optical assembly of claim 9, wherein the path exchange mirror comprises a 90°-β prism with metal thin film coating.

12. The optical assembly of claim 9, wherein the path exchange mirror comprises a 90°-β prism with dielectric thin film coating.

13. The optical assembly of claim 9, where the path exchange mirror comprises a flat mirror.

14. The optical assembly of claim 9, where the polarization beam splitter comprises a combination of a birefringent beam displacer and a prism, from which two emerging polarized beams converge at a distance.

15. The optical assembly of claim 2, wherein the path exchange mirror comprises a rectangular crystal with a reflective coating.

16. The optical assembly of claim 15, wherein the polarization beam splitter comprises a linear polarizer that transmits one polarization and reflects another polarization.

17. The optical assembly of claim 15, wherein the polarization beam splitter comprises a Glan-Thompson polarizing cube.

18. The optical assembly of claim 1, wherein the polarization beam splitter comprises a single element birefringent prism, from which two emerging polarized beams converge at a distance.

19. The optical assembly of claim 18, wherein the two emerging polarized beams are incident on the path exchange mirror with an incidence angle of less than 8°.

20. The optical assembly of claim 18, where the Faraday rotating crystal comprises a 45° rotator that intercepts both paths of the two emerging polarized beams.

21. The optical assembly of claim 18, where the path exchange mirror comprises a flat mirror.

22. A phase conjugate mirror comprising the optical assembly of claim 2.

23. A single element birefringent wedge prism configured such that a light beam enters at a first surface of the single element birefringent wedge prism and two polarized beams exit a second surface thereof at an angle 2β, and converge at a distance, wherein 2β is an angle of separation of the two polarized beams.

* * * * *